Patented Apr. 16, 1935

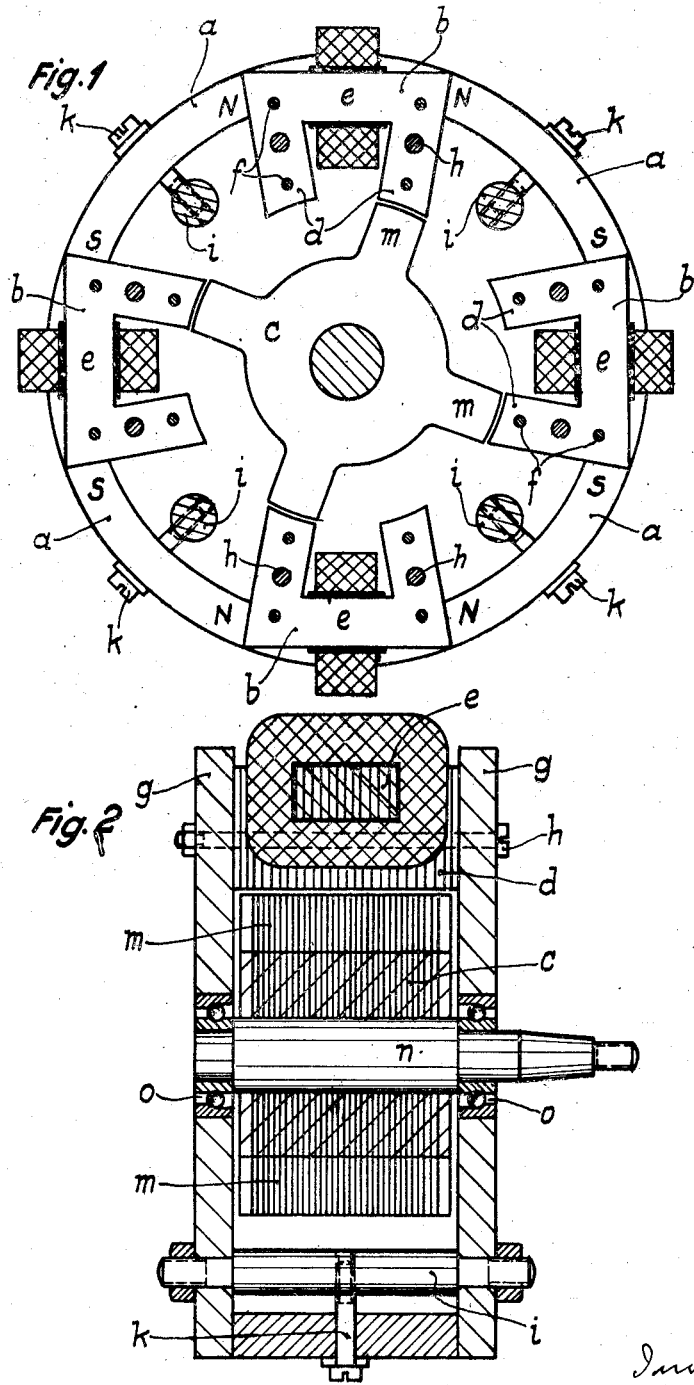

1,998,409

UNITED STATES PATENT OFFICE 1,998,409

DYNAMO ELECTRIC MACHINE

Erich Klaiber, Stuttgart, Germany, assignor to Robert Bosch Aktiengesellschaft, Stuttgart, Germany Application January 26, 1934, Serial No. 708,460
In Germany February 10, 1933

9 Claims. (Cl. 171—252)

The present invention relates to a dynamo or generator having a rotating conducting-piece for the lines of force and stationary permanent magnets whose similar poles are directed towards each other and connected by armature-cores having inwardly-directed shanks between each of which is a winding. The object of the invention is to produce a dynamo which without a regulator can feed several current consumers independently of the speed in such a way that the load on the machine caused by one current consumer has practically no influence on the supply of another current consumer. According to the invention, this is attained by the generator being provided with at least four armature-cores and a star-shaped conducting-piece the arms of which simultaneously close the magnetic circuit of all the armature-cores.

An example of construction of the invention is shown in the drawing, in which:

Figure 1 shows the dynamo or generator in cross section.

Figure 2 is a section on the line 2—2 of Figure 1.

The generator shown in the figures consists essentially of a number of permanent magnets $a$, armature-cores $b$, which form the stationary part of the machine, and a rotating piece $c$ for conducting the lines of force that establishes the magnetic connection between the armature-cores. The armature-cores are of U-shape. They are arranged at equal distances apart from each other and from the axis of rotation of the conducting-piece. Their shanks $d$ are directed inwards. On each web $e$ of the cores is a winding for lighting purposes. The cores are composed of sheet metal plates, held together by rivets $f$. The magnets $a$ are mounted between the armature cores in such a way that two poles of the same sign bear on each core. The whole frame consisting of the magnets and armature-cores is held together by two side-plates $g$ of non-magnetic material. To these the cores are screwed by screws $h$. The plates themselves are secured together and kept at the correct distance apart by screw-bolts $i$. Screws $k$ are screwed into these bolts, and by these screws the magnets are pressed firmly against the armature-cores.

The conducting-piece $c$ for the lines of force has four arms or prongs $m$, which are so spaced apart on the periphery of the conducting-piece that during the working of the machine they simultaneously connect one shank of each armature with the shank situated diametrically opposite to it. The conducting-piece is composed of separate sheets and secured on a shaft $n$, which is mounted by means of ball-bearings $o$ in the side-plates.

The windings may be suitably connected up. They may, for instance, feed four quite separate circuits, or they may, for feeding a single current consumer, all be connected in series or even in parallel. Instead of winding for lighting purposes, ignition windings may be arranged on the armature-cores.

I declare that what I claim is:

1. A dynamo electric machine comprising a number of stationary permanent magnets, pairs of like poles of which are directed towards each other, at least four armature cores each arranged intermediate a pair of like magnet poles, and having inwardly projecting shanks extending therefrom, a winding arranged on each armature core and a rotatable conductor member having arms adapted simultaneously to close the magnetic circuit of all the armature cores.

2. A dynamo electric machine comprising a number of stationary permanent magnets, pairs of like poles of which are directed towards each other, at least four armature cores each arranged intermediate a pair of like magnet poles, and having inwardly projecting shanks extending therefrom, a winding arranged on each armature core and a rotatable star-shaped conductor member having arms adapted simultaneously to close the magnetic circuit of all the armature cores.

3. A dynamo electric machine comprising a number of stationary permanent magnets, pairs of like poles of which are directed towards each other, at least four armature cores each arranged intermediate a pair of like magnet poles and having an inwardly projecting shank extending from each end thereof, a winding arranged on each armature core between said shanks and a rotatable conductor member having arms adapted simultaneously to close the magnetic circuit of the armature cores.

4. A dynamo electric machine comprising a number of stationary permanent magnets, pairs of like poles of which are directed towards each other, at least four armature cores each arranged intermediate a pair of like magnet poles and having an inwardly projecting shank extending from each end thereof, a winding arranged on each armature core between said shanks and a rotatable star-shaped conductor member having arms adapted simultaneously to close the magnetic circuit of all the armature cores through one of said shanks.

5. A dynamo electric machine comprising a number of stationary permanent magnets, pairs of like poles of which are directed towards each other, at least four armature cores each arranged intermediate a pair of like magnet poles, and having inwardly projecting shanks extending therefrom, a winding arranged on each armature core and a rotatable conductor member having a number of arms extending therefrom equal to the number of armature cores and adapted simultaneously to close the magnetic circuit of all the armature cores.

6. A dynamo electric machine comprising a number of stationary permanent magnets arranged in circular disposition end to end with pairs of like poles directed towards each other, at least four armature cores each arranged intermediate a pair of like magnet poles and having inwardly projecting shanks extending therefrom, a winding arranged on each armature core and a conductor member rotatable about an axis at the centre of said circular magnet assembly and having arms adapted simultaneously to close the magnet circuit of all the armature cores.

7. A dynamo electric machine comprising a number of stationary permanent magnets arranged in circular disposition end to end with pairs of like poles directed towards each other, at least four armature cores each arranged intermediate a pair of like magnet poles and having inwardly projecting shanks extending therefrom, a pair of end plates arranged one on each side of said magnet and armature assembly, a winding arranged on each armature core and a conductor member rotatable about an axis at the centre of said circular magnet assembly and having arms adapted simultaneously to close the magnet circuit of all the armature cores.

8. A dynamo electric machine comprising a number of stationary permanent magnets of arcuate form arranged in circular disposition end to end with pairs of like poles directed towards each other, at least four armature cores each arranged intermediate a pair of like magnet poles and having inwardly projecting shanks extending therefrom, a winding arranged on each armature core and a conductor member rotatable about an axis at the centre of said circular magnet assembly and having arms adapted simultaneously to close the magnet circuit of all the armature cores.

9. A dynamo electric machine comprising a pair of end plates spaced apart, armature cores arranged between said end plates, and in circular disposition with regard to the centre of the end plates, a number of stationary permanent magnets arranged one between each pair of armature cores and having pairs of like poles directed towards each other, spacing members between said end plates, screw means engaging the permanent magnets and said spacing means to press the magnets against said cores in a radially inward direction, a winding arranged on each armature core and a rotatable conductor member having arms adapted simultaneously to close the magnetic circuit of all the armature cores.

ERICH KLAIBER.